United States Patent Office 2,961,892
Patented Nov. 29, 1960

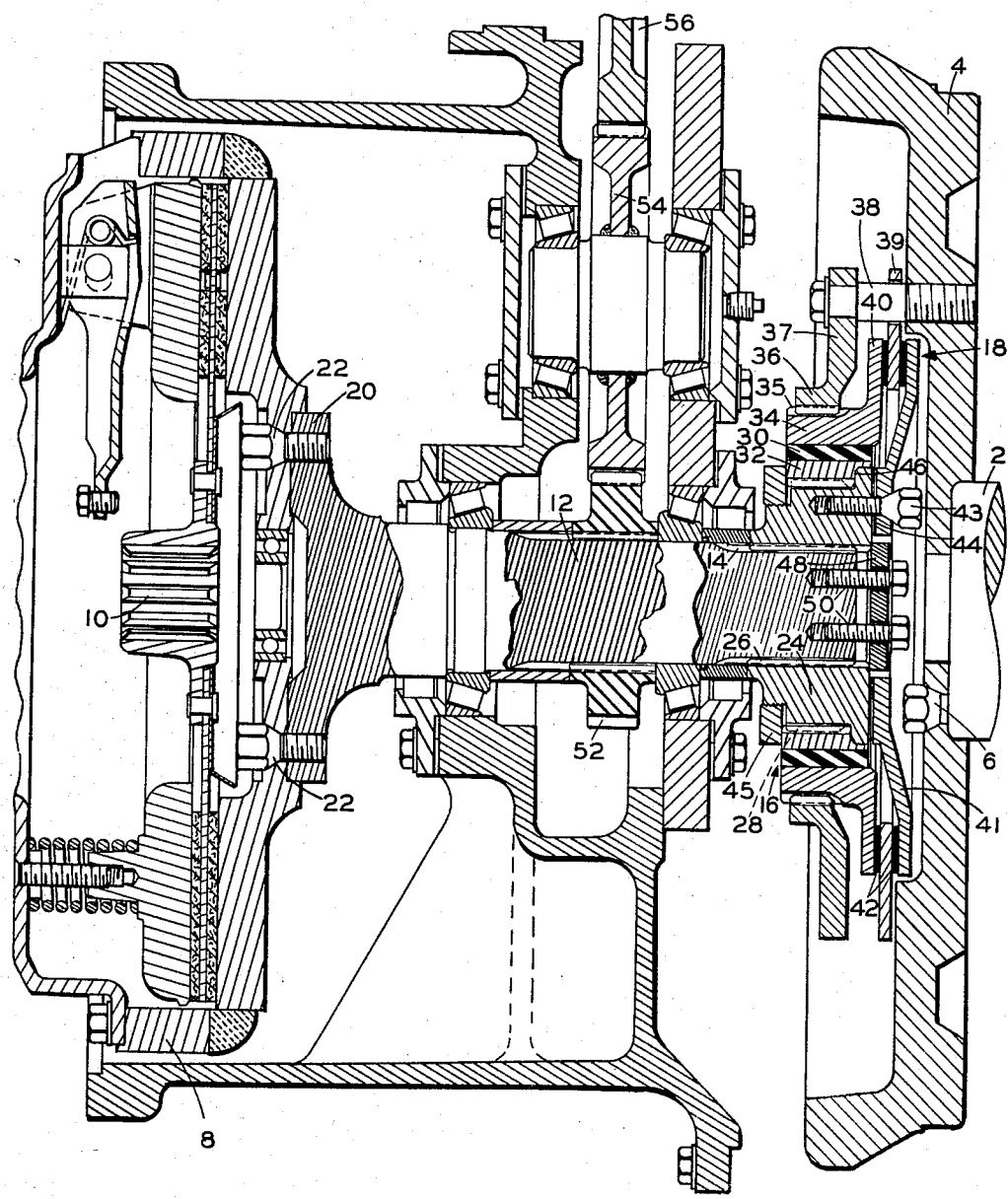

2,961,892
POWER TRANSMISSION DEVICE

Ernst W. Spannhake, Peoria, Ill., assignor to LeTourneau-Westinghouse Company, Peoria, Ill., a corporation of Illinois Filed June 16, 1958, Ser. No. 742,132

10 Claims. (Cl. 74—574)

This invention relates to a device to transmit power, especially to a device to transmit power from a reciprocating-piston type engine having a power take-off.

Engines of the reciprocating-piston type present torsional vibration problems which are often difficult to solve. One such situation occurs when an engine of this type is equipped with a power take-off that must operate whenever the engine is running, and thus cannot come off the change-speed gear box. In that situation, a shaft connects the engine flywheel with the clutch, and power is taken off the shaft. Such a power train is a two-mass system, the engine flywheel assembly being one mass and the clutch assembly being the other mass. If the shaft connecting the two masses is called upon to transmit large torques, the shaft fails because of the torsional shocks unless it is made so large as to be impractical.

It is accordingly an object of this invention to provide a device to transmit power which is capable of absorbing torsional vibrations caused by variations in angular velocity of the power source. This and other objects are accomplished in a device having a drive coupling comprising flexible torque transmitting means which permit the aforesaid variations in angular velocity, and means to dampen said variations.

The sole figure of the drawings shows a preferred embodiment of the invention and is a longitudinal sectional view through a power transmission device made according to this invention.

The drawing shows an engine shaft 2 which may be the crankshaft of any conventional piston-type engine. To the shaft 2, there is secured a flywheel 4 by any suitable means, as for example by threaded members, one of which is shown at 6. The flywheel and its attached operating parts, if any, constitute a flywheel assembly which is one mass of a two-mass system. The other mass of this system consists of a clutch assembly indicated generally at 8 and having an output member 10. A drive coupling connects the two masses and includes a shaft 12 having a driving connection at its one end with one mass of the system (here shown as the clutch assembly) and splines 14 at its other end, flexible torque transmitting means indicated generally at 16 connected with the shaft splines and with the other mass (in this embodiment, the flywheel assembly), and friction means indicated generally at 18 connected with the shaft splines and having a friction connection with said other mass (the flywheel assembly).

More specifically, the clutch assembly 8 may be any one of a number of conventional clutches the details of which need not be set forth here. Shaft 12 is shown as provided with a flange 20 to which the input clutch member is secured by threaded members 22. At its other end, shaft 12 is provided with splines 14 as aforesaid. For ease of assembly, the connection of the flexible torque transmitting means 16 and the friction means 18 with the splines 14 is not a direct one. Instead, a member 24 is provided with internal splines 26 which engage the shaft splines 14; member 24 is then additionally provided with external splines 28 to which the flexible torque transmitting means 16 is connected by means of cooperating internal splines.

In the embodiment shown, the flexible torque transmitting means 16 takes the form of a resilient bushing 30 of rubber or the like. Resilient bushing 30 is securely bonded to metal rings 32 and 34. The resilient bushing and its method of manufacture are not the subject of this application. Bushings of this type are commercially available, for example, from Clevite Harris Products, Inc., Cleveland, Ohio.

Ring 32 is internally splined to cooperate with the external splines 28 referred to above. Ring 34 is externally splined as shown at 35 to cooperate with the internal splines of a ring 36 which carries a flange 37. Flange 37 is provided with spaced openings to receive threaded members, one of which is shown at 38 carried by flywheel 4. A disc 39 is mounted on the threaded members 38; the openings in disc 39 through which members 38 pass are slightly larger than members 38 with the result that disc 39 is free to "float" axially on members 38.

Ring 34 is flanged as shown at 40 to provide an annular friction surface and is mounted adjacent disc 39 to the end that the annular friction surface of disc 39 may be gripped between flange 40 and another annular friction surface on a disc 41. One or more of the annular friction surfaces is preferably provided with a suitable friction-providing material 42 such as is used for brake lining, clutch facing, and the like.

Disc 41 is suitably secured, as by threaded members such as the one shown at 43, to member 24, and one or more shims 44 may be placed between the hub of disc 41 and member 24 to provide adjustability for the axial pressure applied to the friction material 42 by bushing 30. A nut 45 is threaded onto member 24 and clamps ring 32 between itself and a shoulder 46 on member 24.

It may be noted here that the internally and externally splined member 24 may be secured in place in any suitable manner, as for example by a plate 48 and threaded members 50, members 50 engaging the end of shaft 12.

Power is taken off the shaft 12 by means of a gear 52 suitably mounted on and secured to the shaft. In the embodiment shown, gear 52 meshes with another gear 54 which in turn meshes with still another gear 56. Gear 56 drives the power take-off shaft through any suitable connection. The various shafts and gears are suitably mounted for rotation in conventional bearings which need not be described in detail inasmuch as such matters are well understood by those skilled in the art.

Operation

As the engine of crankshaft 2 rotates, it drives the two-mass system which includes the flywheel assembly and the clutch assembly. The power impulses of the several cylinders cause the flywheel 4 to turn with a variable angular velocity. If shaft 12 were rigidly connected to the two masses, the torsional vibrations caused by the variations in angular velocity would eventually result in failure of the shaft. It is conceivable that the shaft 12 could be made so large as to avoid such failure, but a shaft large enough to meet the requirements from the standpoint of satisfactory service would be so large as to be impractical. Accordingly, the means 16 are provided, these means comprising flexible torque transmitting means which permit variations in angular velocity of the flywheel 4 but without transmitting those variations to the shaft 12 to any considerable extent.

It has been found that, under certain load and speed conditions, as well as such considerations as number of engine cylinders, whether the engine is a two-stroke cycle engine or a four-stroke cycle engine, and the like, that the amplitude of the torsional vibrations caused by the varying angular velocity of flywheel 4 is so large as to result in early failure of the resilient bushing 30. To extend the life of bushing 30 sufficiently to make such a drive feasible, it has been found desirable to add means to dampen the torsional vibrations or variations in angular velocity. The friction means 18 has the effect of dampening the variations. In actual practice, a successful combination has been built in which bushing 30 is axially pre-stressed sufficiently to make the friction means capable of transmitting torque having an order of magnitude equal to net engine torque, although it will be understood by those skilled in the art that considerable variation in the transmitted torque can be tolerated.

Bushing 30 is stressed axially by rings 32 and 34 to which it is bonded, and thus resiliently loads the friction means 18. This loading of the friction means can be varied by changing the number of shims 44 as suggested above. The several splines and the "floating" of disc 39 on threaded members 38 assure that the loading of friction means 18 puts no axial thrust on the engine crankshaft.

It will be apparent from the foregoing that there is here provided a power transmission device which is capable of transmitting engine torque through a two-mass system with a minimum of transmission of torsional vibrations and a consequent maximum life of the power transmission device. Other advantages will be apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. In a power transmission device for a two-mass system; a drive coupling comprising a shaft having a relatively inflexible driving connection at its one end with one mass of the system, flexible torque transmitting means and a pair of elements secured thereto, one of said elements connected with the other mass of the system and the other connected with the other end of the shaft, and a three-member friction device having one member connected with said other mass and two members connected with said pair of elements.

2. In a power transmission device for a two-mass system, one mass having a variable angular velocity: a drive coupling comprising a shaft having a relatively inflexible driving connection at its one end with one mass of the system, flexible torque transmitting means, a pair of elements secured to said means and thereby having a limited angular movement relative to each other, one element of the pair of elements being connected with the other mass of the system and the other being connected with the other end of the shaft, a friction member connected with one element of the pair of elements, a second friction member connected with the other element of the pair, and a third friction member frictionally engaged by the first two friction members and connected with the other mass of the system, whereby the flexible torque transmitting means resiliently loads the engagement of the third friction member with the first and second friction members.

3. A device as in claim 2, in which the first and second friction members are disposed on opposite sides of the third friction member to grip said third member between them, the first and second friction members being biased into engagement with the third friction member by the flexible torque transmitting means.

4. A device as in claim 2, and power take-off means connected with the shaft.

5. In a power transmission device for a two-mass system, one mass having a variable angular velocity: a drive coupling comprising a shaft having a relatively inflexible driving connection at its one end with one mass of the system, an axially and torsionally resilient and elastic bushing, a pair of elements secured to the bushing and thereby having a limited axial and angular movement relative to each other, one element of the pair of elements being connected with the other mass of the system and the other being connected with the other end of the shaft, a friction member connected with one element of the pair of elements, a second friction member connected with the other element of the pair, and a third friction member frictionally engaged by the first two friction members and connected with the other mass of the system, whereby the resilient and elastic bushing loads the engagement of the third friction member with the first and second friction members.

6. A power transmission device to connect a two mass system, one mass of which is a driving mass and the other mass of which is a driven mass, said device comprising a shaft having one end connected to the driven mass; a pair of concentric annular members, said members being positioned in a plane normal to the axis of rotation of the shaft, the inner member being attached to the shaft, the other of said members being attached to the driving mass; a resilient bushing positioned in said plane and between the members, said bushing being connected to each of the members; and a friction means having at least two parts in frictional engagement, one of said parts being connected to the driving mass and the other of said parts being connected to the inner member.

7. In a power transmission device for a two-mass system turnable about an axis of rotation: a resilient bushing coaxial with said axis and connected in torsion to transmit torque between the two masses of the system; friction means connected to transmit torque between the two masses of the system; and means axially loading said bushing in shear to apply load to the friction means.

8. A device as in claim 7, in which the friction means includes three members; the axial loading means includes two elements secured to the bushing; and the two elements are connected with two of the three members.

9. A device as in claim 7, in which the friction means includes two members frictionally engaging a third member between them; the axial loading means includes two elements secured to the bushing; and the two elements are connected with said two members.

10. A device as in claim 9, and means engaging said third member to secure it against rotation relative to one of the masses of the two-mass system, and a longitudinally slidable and angularly fixed connection between said engaging means and one of said two elements.

References Cited in the file of this patent

UNITED STATES PATENTS

| | | |
|---|---|---|
| 1,716,284 | Risley | June 4, 1929 |
| 1,804,121 | Simonds | Mar. 5, 1931 |
| 1,861,390 | Gunn | May 31, 1932 |
| 1,925,278 | Paton | Sept. 5, 1933 |
| 1,965,742 | Junkers | July 10, 1934 |
| 1,982,658 | Griswold | Dec. 4, 1934 |
| 1,984,577 | Griswold | Dec. 18, 1934 |
| 2,261,019 | Chilton | Oct. 28, 1941 |
| 2,333,122 | Prescott | Nov. 2, 1943 |
| 2,450,701 | Wahlberg et al. | Oct. 5, 1948 |
| 2,680,377 | Gerst | June 8, 1954 |

FOREIGN PATENTS

| | | |
|---|---|---|
| 513,914 | Great Britain | Oct. 25, 1939 |